United States Patent
Harrington

(10) Patent No.: US 9,328,262 B2
(45) Date of Patent: May 3, 2016

(54) ADHESION PROMOTING LAYER FOR COMPOSITE ASSEMBLIES

(75) Inventor: Chris Harrington, Ware (GB)

(73) Assignee: Hexcel Composites Limited, Duxford (GB)

( * ) Notice: Subject to any disclaimer, the term of this patent is extended or adjusted under 35 U.S.C. 154(b) by 755 days.

(21) Appl. No.: 12/598,569

(22) PCT Filed: May 23, 2007

(86) PCT No.: PCT/IB2007/001601
§ 371 (c)(1),
(2), (4) Date: Nov. 2, 2009

(87) PCT Pub. No.: WO2008/142474
PCT Pub. Date: Nov. 27, 2008

(65) Prior Publication Data
US 2010/0068497 A1     Mar. 18, 2010

(51) Int. Cl.
*C09J 5/06* (2006.01)
*C08J 3/24* (2006.01)

(52) U.S. Cl.
CPC .. *C09J 5/06* (2013.01); *C08J 3/242* (2013.01); *Y10T 428/249939* (2015.04); *Y10T 428/28* (2015.01)

(58) Field of Classification Search
CPC ................. C08J 3/242; Y10T 428/249939
USPC ....................................... 156/308.6
See application file for complete search history.

(56) References Cited

U.S. PATENT DOCUMENTS

| | | | | | |
|---|---|---|---|---|---|
| 4,242,406 | A | * | 12/1980 | El Bouhnini et al. | 442/373 |
| 5,164,127 | A | * | 11/1992 | Boeckeler | 264/447 |
| 5,904,986 | A | * | 5/1999 | Smith | 428/423.7 |
| 6,117,536 | A | * | 9/2000 | Poutasse | 428/301.1 |
| 6,660,373 | B2 | * | 12/2003 | Hsu et al. | 428/297.4 |
| 2003/0124355 | A1 | * | 7/2003 | Li et al. | 428/417 |
| 2010/0147451 | A1 | * | 6/2010 | Morillo | 156/245 |

FOREIGN PATENT DOCUMENTS

| | | |
|---|---|---|
| DE | 221 419 A1 | 4/1985 |
| DE | 35 08 601 A1 | 9/1986 |
| EP | A-1 035 156 | 9/2000 |
| EP | 1 144 190 B1 | 12/2003 |
| EP | 1 553 125 A1 | 7/2005 |
| EP | 1 128 958 B1 | 8/2005 |
| JP | S61-214495 A | 9/1986 |
| WO | WO 01/19607 A | 3/2001 |

* cited by examiner

*Primary Examiner* — Jennifer Chriss
*Assistant Examiner* — Camie Thompson
(74) *Attorney, Agent, or Firm* — W. Mark Bielawski; David J. Oldenkamp

(57) ABSTRACT

The adhesion between an underlying composite material and its surface finish is increased by including an adhesion promoting layer at the interface where the uncured composite material and the surface finish meet during the lay up of the uncured composite assembly. The adhesion promoting layer includes a cure accelerating agent for the composite material matrix resin.

20 Claims, 1 Drawing Sheet

ADHESION PROMOTING LAYER FOR COMPOSITE ASSEMBLIES

BACKGROUND OF THE INVENTION

1. Field of the Invention

The present invention relates generally to composite materials and methods for bonding various layers of composite assemblies together. More particularly, the present invention involves promoting adhesion between the structural portion of a composite assembly and the exterior portion of the assembly whether it is a gel coating or other substrate.

2. Description of Related Art

Composite materials include a combination of resin matrix and fiber reinforcement. Composite materials have been developed for use in wide variety of applications that include a vast array of resin/fiber combinations and orientations. A common type of composite assembly includes an underlying structural composite component that is covered with a surface finish. The structural component typically includes a resin matrix in which multiple layers (plies) of fibrous reinforcement are located. Surface finishes include a variety of resin coatings, foam, wood, metal and plastic laminates.

Pre-impregnated composite material (prepreg) is used widely in the manufacture of composite parts. Prepreg is a combination of uncured resin matrix and fiber reinforcement, which is in a form that is ready for molding and curing into the final composite part. By pre-impregnating the fiber reinforcement with resin, the manufacturer can carefully control the amount and location of resin that is impregnated into the fiber network and ensure that the resin is distributed in the network as desired. It is well known that the relative amount of fibers and resin in a composite part and the distribution of resin within the fiber network have a large affect on the structural properties of the part. Prepreg is a preferred material for use in manufacturing structural parts where it is important that the part meets established strength and weight requirements.

Gel coating is a popular surface coating technique in which a resin is typically applied to the mold surface and partially cured to a gelled state. Resin and fibrous support are then layered onto the gel coat or applied as a prepreg. The resulting assembly is then cured to form the composite part. Gel coats have been widely used in the marine industry for the production of large parts, such as boat hulls and masts and other marine parts that require a smooth and rugged surface finish. Gel coats have also been used in the production of other large parts, such a wind turbine blades where large size, high strength and low weight are a desired combination.

The resin matrices commonly used for the above mentioned large structures are formulated to cure at temperatures of around 120° C. These resins are frequently supplied in the form of a prepreg that is composed of about 60 to 70 weight % reinforcing fiber, such as glass fibers or carbon fibers and about 30 to 40 weight % of a thermosetting resin matrix, such as epoxy. As part size increases, the curing temperature becomes an important consideration. Large amounts of energy are required and the cost of constructing sufficiently large ovens with the required high temperature capability is not economically attractive. In addition, the tooling used for molding composite parts at cure temperatures of 120° C. and above must be made from expensive premium materials that can become extremely costly as the size of the part being molded increases.

One approach to reducing molding costs for large parts has been to move the curing temperature below 100° C. Target curing temperatures of below 90° C. have been particularly attractive. For boat hulls and other large structures, maximum curing temperatures on the order of around 65° C. and lower have been tried. Unfortunately, the reduction in cure temperature also causes reduced adhesion between the gel coating and underlying composite material regardless of how long the assembly is cured.

One approach to increasing gel coat adhesion at low curing temperatures has been to increase the amount of curing agent in the resin matrix of the uncured composite material. This approach has provided some increase in adhesion. However, the room temperature handling time (also referred to as out-life) of the resin or prepreg is severely reduced when extra curing agent is added. In addition, the tack (stickiness) of the resin or prepreg drops relatively quickly at room temperature when extra curing agent is used. Good tack is required in order for the uncured composite material to stick to the gel coat and the other laminates in the mold as the assembly is formed.

Another approach to increasing gel coat adhesion at low curing temperatures has involved placing an adhesive between the composite material (prepreg) and the gel coat. These adhesive layers are referred to as "tie coats" and typically are made up of two parts. The first part is spread onto the surface of the gel coat after it has gelled and the second part is added shortly before the composite material (prepreg) is laid up in the gel-coated mold. This approach is not entirely satisfactory, since it is difficult to apply an even coating of the two adhesive parts. In addition, there are environmental concerns, such as amine corrosion and amine sensitivity to moisture/carbon dioxide for epoxy-based gel coats and styrene emission concerns for polyester gel coat systems.

In view of the above, there is a continuing need to develop new processes and systems for making composite assemblies at low cure temperatures where the adhesion between the underlying composite material and exterior finish coating is increased.

SUMMARY OF THE INVENTION

Methods and systems are provided in accordance with the present invention for improving the adhesion between composite materials and their exterior finish coatings even when the composite material is cured at relatively low temperatures.

The invention is based in part on the discovery that the adhesion between an underlying composite material and its surface finish can be increased by including an adhesion promoting layer at the interface where the uncured composite material and the surface finish meet during the lay up of the uncured composite assembly. It was further discovered that this increase in adhesion could be obtained without significantly reducing the out-life or tack of the uncured composite material. In addition, it was found that this increase in adhesion was especially well suited for improving the adhesion between composite materials and gel coat systems that are cured at temperatures below 100° C. and preferably at temperatures in the range of 60° C. and 90° C.

The present invention covers methods for bonding two surfaces together in which a composite material having a first surface is bonded to a substrate having a second surface. The composite material includes an uncured thermosetting resin, one or more curing agents for the thermosetting resin and a fibrous reinforcement. When the composite material and surface substrate are placed together during bonding, the first and second surfaces form a bond interface. As a feature of the invention, an adhesion promoting layer is located at the bond interface to improve adhesion. The adhesion promoting layer includes a cure accelerating agent for the uncured thermosetting resin.

The present invention also covers the composite parts made using the adhesion promoting layer, as well as the uncured prepreg that includes an adhesion promoting layer. The adhesion promoting layer may be used with a wide variety prepreg types including prepreg and prepreg systems that contain either fully formulated matrix resins or partially formulated matrix resins that only become fully formulated during the curing process. The invention is particularly well suited for making large composite parts where it is desirable to keep cure temperatures as low as possible while still maintaining adequate levels of adhesion between the composite material and the surface substrate.

The above described and many other features and attendant advantages of the present invention will become better understood by reference to the following detailed description when taken in conjunction with the accompanying drawings.

DETAILED DESCRIPTION OF THE INVENTION

The present invention may be used in the fabrication of a wide variety of composite assemblies. It is preferably used in the fabrication of large parts such as boat hulls, boat masts and wind turbine blades. In addition to the marine industry and wind turbine industry, the present invention finds use wherever it is desired to increase the adhesion between an underlying composite material and a surface substrate. It is preferred that the invention be used to increase the adhesion of prepreg or other composite material to a surface finish that also contains resin, such as gel coats. However, the invention may also be used to increase the adhesion of composite materials to a variety of other surface finishes including foams, wood, metal and plastic laminates.

The invention is based in part on the discovery that the adhesion between an underlying composite material and its surface finish can be increased by including an adhesion promoting layer at the interface where the uncured composite material and the surface finish meet during the lay up of the uncured composite assembly. It was further discovered that this increase in adhesion could be obtained without significantly reducing the out-life or tack of the uncured composite material. In addition, it was found that this increase in adhesion was especially well suited for improving the adhesion between composite materials and gel coat systems that are cured at temperatures below 100° C. and preferably at temperatures in the range of 60° C. and 90° C.

The invention is intended for use with existing epoxy prepreg and gel coat systems wherein the prepreg includes a fully formulated matrix resin. The term "fully formulated" means that the matrix resin includes the normal amount of curing agent and other ingredients that are used when the prepreg is cured at temperatures of 100° C. and above. The adhesion promoting layer of the present invention is designed to provide an additional amount of cure accelerating agent only at the bond interface. It was discovered that the inclusion of a cure accelerating agent at the prepreg/gel coat interface provides substantial increases in bond strength even when the system is cured at relatively low temperatures of between 60° C. and 90° C.

Figure 1:
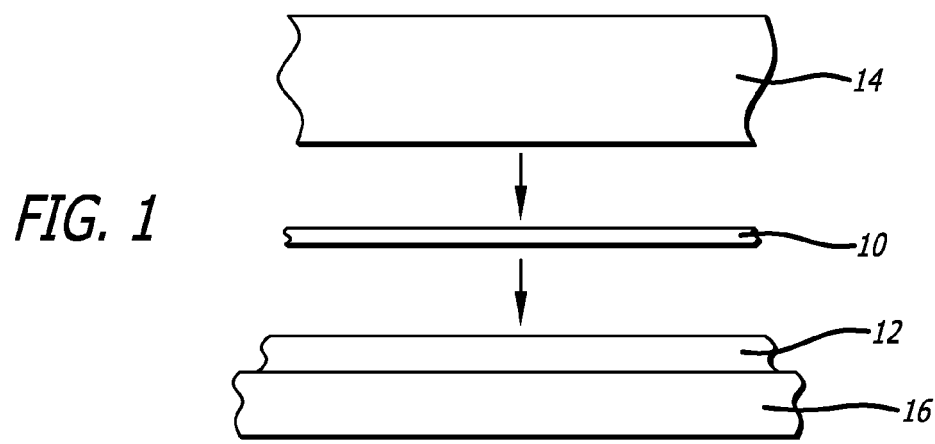
FIG. 1 is a schematic view of an exemplary process for bonding composite material to a substrate where the adhesion promoting layer in accordance with the present invention is provided as a separate layer that is sandwiched between the composite material and substrate during the bonding process.

By way of example, an adhesion promoting layer in accordance with the present invention is shown at 10 in FIG. 1. The adhesion promoting layer 10 is used increase the adhesion between a substrate, such as a gel coat 12 and a composite material, such as prepreg 14. As is well known, the gel coat 12 is initially applied to a mold 16 and partially cured to form a gelled substrate. The gel coat 12 may be formed using any of the gel coat materials and gelation processes that are used in the preparation of composite structures. The gel coat should be in a gelled state prior to contact with the adhesion promoting layer 10. Gel coats made using epoxy resins are preferred. Other suitable gel coat resins include polyester, vinyl ester, polyurethane and phenolic resole resins. Gel coat materials are available from a variety of commercial sources. Examples are HexCoat® gel coat material that is available from Hexcel Composites, Ltd. (Duxford, England).

The prepreg 14 may be any of the prepreg materials commonly used in making large structures. The prepreg 14 includes an uncured thermosetting resin, curing agents and/or additives and a fibrous reinforcement. As mention above, the uncured thermosetting resin, curing agents and/or additives are selected to provide a fully formulated resin matrix in accordance with established practice for a particular prepreg system. The fibrous reinforcement may be made from any of the fiber types used in making composite materials including glass, carbon, ceramic, aramid (aromatic polyamide), p-aramid, quartz, thermoplastic, boron, ceramic and natural fibers are common. The fibers can be chopped, stretch broken, randomly oriented, unidirectional in orientation or woven into fabric. Glass and carbon fibers are preferred. The fibrous reinforcement may be in any of the forms used to make composite structures. These include woven fabric, unidirectional fibers, quasi-isotropic and randomly oriented fibers that may be chopped or stretch-broken. The fibrous reinforcement may be a single layer or multiple layers. The number of filaments in each fiber yarn as well as the weight of the fibrous reinforcement can also vary widely depending upon the particular application. For large structures, the fibrous reinforcement should have masses on the order of 40 to 4000 grams per square meter (gsm). Fibrous reinforcement weighing 150 to 2500 gsm is preferred with weights on the order of 300 to 1500 gsm being particularly preferred. The number of filaments per fiber can also vary widely and typically will be on the order of 3000 to 320,000. For carbon-based fibrous reinforcement, from 3,000 to 160,000 filaments per fiber are preferred with 3,000 to 40,000 tex being particularly preferred. For glass fiber reinforcements, fibers of 300 to 2400 tex fibers are preferred for making large structures.

The exemplary prepreg 14 is shown fully impregnated with a homogeneous mixture of uncured thermosetting resin and an appropriate amount of curing agent(s) and additives, if any, to provide a fully formulated resin. The resin is formulated for curing at normal cure temperatures of between about 75° C. and 160° C. Any of the fully formulated resins that are used to make prepreg, which is suitable for fabricating large structures, may be used. The amount of uncured thermosetting resin in the prepreg 14 should be between about 30 to 60 percent by weight of the total prepreg weight and preferably between about 35 to 45 weight percent. Exemplary prepreg that include a fully formulated epoxy matrix resin include HexPly® M9.1 and M9.6, which are available from Hexcel Composites (Duxford, England).

Exemplary thermosetting resins that may be used in the prepreg matrix include epoxy, polyester, vinyl ester, phenolic resins, cyanate esters, bismaleimides and benzozazines. Epoxy resins are preferred. The epoxy resin may be toughened with thermoplastic materials, if desired. The uncured resin includes suitable curative agents and other additives that are appropriate for the particular resin being used. The epoxy resin can be made up of difunctional epoxies alone or in combination with multifunctional (i.e. trifunctional and/or tetrafunctional) epoxies. Difunctional epoxy resins, by way of example, include those based on: diglycidyl ether of Bisphenol F, Bisphenol A (optionally brominated), phenol and cresol epoxy novolacs, glycidyl ethers of phenol-aldelyde adducts, glycidyl ethers of aliphatic diols, diglycidyl ether, diethylene glycol diglycidyl ether, Epikote, Epon, aromatic epoxy resins, aliphatic triglycidyl ethers, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol A or F. The difunctional epoxy resins may be used alone or in any suitable combination.

The optional multifunctional epoxy resins may be saturated, unsaturated, cylcoaliphatic, alicyclic or heterocyclic. Suitable additional multifunctional epoxy resins, by way of example, include those based upon Bisphenol-A (optionally brominated), phenol and cresol epoxy novolacs, glycidyl ethers of phenol-aldelyde adducts, glycidyl ethers of dialiphatic diols, diglycidyl ether, diethylene glycol diglycidyl ether, Epikote, Epon, aromatic epoxy resins, dialiphatic triglycidyl ethers, aliphatic polyglycidyl ethers, epoxidised olefins, brominated resins, aromatic glycidyl amines, heterocyclic glycidyl imidines and amides, glycidyl ethers, fluorinated epoxy resins, or any combination thereof.

The prepreg matrix resin includes at least one curing agent. Any of the curing agents that are suitable for curing thermosetting resins may be used. The curing agent(s) can be any of the curing agents that are normally used with thermosetting resins systems. Suitable curing agents include aliphatic and/or aromatic amines, polyetheramines, tertiary amines cycloaliphatic amines polyamides, amidoamines, imidazoles, boron trifluoride, boron trifluoride-amine complexes, anhydrides and dicyandiamide. Specific examples include diethylene triamine (DETA), triethylene tetramine (TETA), tetraethylenepentamine (TEPA), meta-xylenediamine (MXDA), isophoronediamine (IDPA) and methylene-di(cyclohexaylamine) (PACM).

Dicyandiamide is a preferred curing agent. Dicyandiamide is widely used as an epoxy curative because it provides room temperature stability and relatively rapid curing at elevated temperatures. Curing agents, such as dicyandiamide, are typically used in combination with one or more other curing agents and/or accelerators. Suitable combinations of curing agents include: dicyandiamide and 2-phenyl-imidazole (2PZ); dicyandiamide and N,N-(4-methyl-m-phenylene bis (N',N'-dimethylurea) (UR500), dicyandiamide and N,N-dimethyl, N'-3,4-dichlorophenyl urea (Diuron). Exemplary accelerators include substituted ureas or substituted imidazoles. Preferred accelerators include N,N-dimethyl, N'-3,4-dichlorophenyl urea (Diuron), N,N-dimethyl, N'-3-chlorophenyl urea (Monuron) and N,N-(4-methyl-m-phenylene bis[N',N'-dimethyurea) (UR500).

The matrix resin may also include any of the additional ingredients that are included in the resin matrix as performance enhancing or modifying agents. Examples are flexibilizers, toughening agents, thermoplastic core and shell particles, flame-retardants, wetting agents, pigments and dyes, ultraviolet light absorbers, anti-fungal compounds, fillers and viscosity modifiers.

Preferred exemplary matrix resins will include: 70 to 95 weight % bisphenol A resin; 1 to 10 weight % dicyandiamide; 1-10 weight % urone and 1-10 weight % 2PZ. More preferred are resins containing 85 to 90 weight % bisphenol A resin; 3 to 6 weight percent dicyandiamide; 3 to 6 weight percent urone and 3-6 weight percent 2PZ.

The adhesion promoting layer 10 is preferably provided in the form of a fibrous element that has been coated with a suitable cure accelerating agent. The fibrous element is preferably made from synthetic or natural fibers or a combination of the two. Suitable fibers include glass, carbon, aramid, nylon, polyester, cotton, hemp and kenaf. Glass is the preferred type of fiber. The fibrous element may contain continuous or discontinuous fibers or a combination of both. The fibrous element may be in any of the wide variety of forms that are well known in the textile industry. Such forms include veil, fleece, mat, scrim, gauze, non-woven mat and knit or two-dimensional woven fabric. The areal weight of the fibrous element is between 10 to 1000 grams per square meter (gsm). Preferably, the areal weight of the fibrous element will be between 20 to 600 gsm. Even more preferred are fibrous elements that have areal weights of between 40 and 100 gsm.

The cure accelerating agent may be a catalyst or accelerator that is suitable for use with thermoset resins and particularly epoxies. Suitable cure accelerating agents include salts of alkaline earth metals, azides, ureas, free radical initiators and the amine salts of boron halogen complexes. Exemplary cure accelerating agents include: 2-ethyl-4-methyl imidazole (2E4MZ); 2-phenyl-imidazole (2PZ); and Curezol MZ azine S.

It is preferred that the cure accelerating agent be more reactive with the thermosetting resin than the curing/accelerator agent(s) that are already present in the matrix resin. For example, when dicyandiamide and/or 2PZ are used as the curing agent(s), it is preferred that the cure accelerating agent be a more reactive imidazole, such as 2-ethyl-4-methyl imidazole.

The amount of cure accelerating agent that is present in the adhesion promoting layer may be varied provided that the amount is sufficient to promote high degrees of chemical conversion at the critical area where adhesion is required. These high degrees of conversion are required for adequate adhesion to the substrate. A high degree of chemical conversion means that most (i.e. at least 90 percent) of the reactive sites in the thermoset resin and curing agent(s) have been consumed. The amount of cure accelerating agent required is a non-stoichiometric amount and is preferrably determined empirically for the particular resin matrix being used. The preferred amount is the minimum amount of cure accelerating agent that is required to insure good bonding between the composite material and the gel coat or other substrate. For most epoxy matrix resins, the amount of cure accelerating agent present in the adhesion promoting layer should be between 1 and 50 gsm. The preferred amount of cure accelerating agent is between 1 and 10 gsm.

The cure accelerating agent may be deposited onto the fibrous element using any of the conventional techniques for adding chemical components to fibrous materials. The cure accelerating agent may be applied only to the surface of the fibrous element or it may be impregnated throughout. The cure accelerating agent is preferably dissolved in an appropriate solvent and then applied to the fibrous element. The solution of containing the cure accelerating agent may be sprayed onto the element or the element can be immersed in the solution. These types of application techniques are well known.

In many situations, it is desirable to provide an adhesion promoting layer that has some inherent stickiness, which is commonly referred to as "tack". The adhesion promoting layer preferably has sufficient stickiness or tack so that it can be stuck onto a vertically oriented mold or a mold that contains complex shapes. In accordance with the present invention, it was discovered that a tack agent may be incorporated into adhesion promoting layer to provide tackiness without adversely affecting the overall adhesion between the substrate and prepreg.

A tack agent is any compound that promotes tackiness and that is known for use in combination with thermosetting resins. Suitable tack agents that may be incorporated into the adhesion promoting layer include carboxy terminated acrylonitrile butadiene liquid rubbers, such as Hycar CTBN1300X8 and Hycar CTBN1300X13 (Noveon located in Cleveland, Ohio) and amine terminated acrylonitrile butadiene liquid rubbers, such as Hycar ATBN1300X16 and Hycar 1300X21, which are also available from Noveon. Other suitable tack agents include the products of chemical reactions between such rubbers and epoxy resins, commonly known as adducts, such as Hypox RA 1340 or Hypox RA 840 (CVC Specialty Chemicals located at Moorestown, N.J.) and alternatively such as Struktol Polydis 3614 (Schill and Seilacher located at Hamburg, Germany). Carboxylated nitrile elastomers, such as Nipol 1472 (Zeon corporation, Tokyo, Japan) are exemplary tack agents. Polyurethane prepolymer tougheners, such RAM 965 (Huntsman located at Salt Lake City, Utah), are also exemplary tack agents.

The tack agent is preferably dissolved into the same solution as the cure accelerating agent so that the two components are applied to the fibrous element at the same time. If desired, however, the tack agent may be applied to the fibrous element separately. When a tack agent is included in the adhesion promoting layer, it preferred that the amount of cure accelerating agent be reduced so that the combined amount of the cure accelerating agent and tack agent does not exceed 50 gsm. However, the combined amount of cure accelerating agent and tack agent may be higher, if desired.

When used, the tack agent should be present in amounts ranging from 5 to 50 weight percent of the total weight of cure accelerating agent and tack agent. Preferably, the tack agent will be present in amounts ranging from 10 to 40 weight percent and even more preferably in the range of 15 to 35 weight percent of the total weight of cure accelerating agent and tack agent. The amount of tack agent will vary depending upon the particular tack agent being used and the amount of tack required in order to insure that the adhesion promoting layer remains stuck to the mold in the desired orientation.

Figure 2:
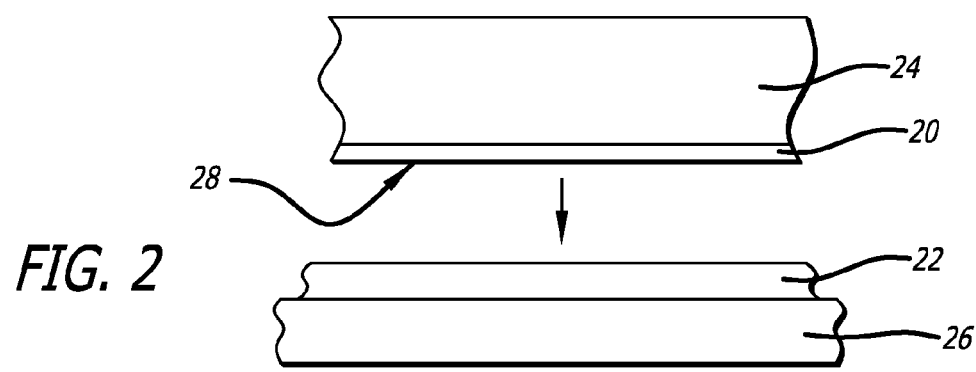
FIG. 2 is a schematic view of an alternative exemplary embodiment of the present invention in which the adhesion promoting layer is applied to the surface of a prepreg that includes a fully formulated matrix resin that is distributed throughout the fibrous reinforcement.

An alternate exemplary embodiment of the invention is shown in FIG. 2. In this embodiment, the adhesion promoting layer 20 is attached to the prepreg 24 prior to lay up of the prepreg 24 on the gel coat 22 located on mold 26. The prepreg 24 includes a fully formulated uncured resin matrix. This embodiment simplifies the use of the adhesion promoting layer, since the adhesion promoting layer is preferably added to the prepreg during the prepreg manufacturing process. This eliminates the need for an adhesion promoting layer that must be applied separately to the gel coat during the molding process. In this embodiment, it is preferred that the cure accelerating agent be located on the surface 28 of the adhesion promoting layer 20. This configuration prevents or at least substantially reduces any contact between the cure accelerating agent and the resin matrix until the prepreg 24 is laid up in the mold and cured. The out life of the prepreg/adhesion promoting layer combination (24 and 20) is increased by preventing contact between the relatively active cure accelerating agent and the uncured resin matrix.

Figure 3:
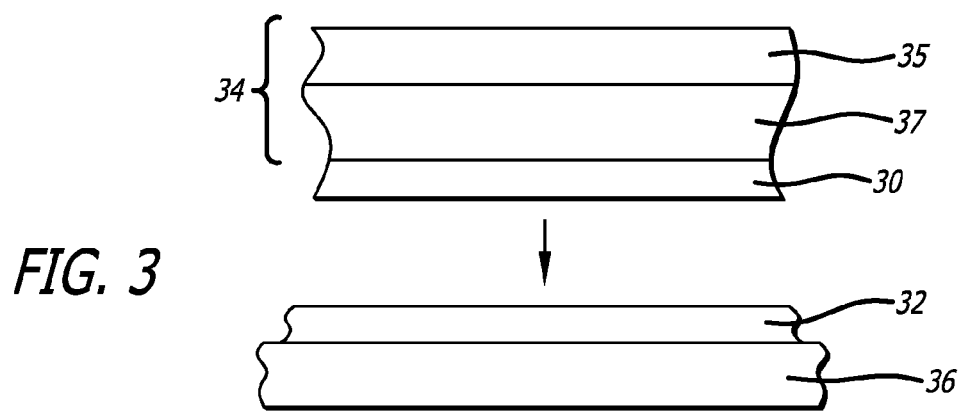
FIG. 3 is a schematic view of a further alternative exemplary embodiment of the present invention in which the adhesion promoting layer is located on the surface of a prepreg that includes a partially formulated matrix resin that is located on one side of a fibrous reinforcement. The fibrous reinforcement is loaded with a curing agent that is mixed with the resin as it migrates through the fibrous reinforcement during cure to provide a fully formulated resin.

Another exemplary embodiment of the present invention is shown in FIG. 3. In this embodiment, the adhesion promoting layer 30 is also attached to the prepreg 34 prior to lay up of the prepreg 34 on gel coat 32 located on mold 36. The adhesion promoting layer 30 is preferably attached to the prepreg 34 during manufacture of the prepreg. The prepreg 34 does not contain a fully formulated matrix resin. Instead, the prepreg 34 is divided into a prepreg component 35 that contains a fibrous layer that is impregnated with a partially formulated matrix resin. The partially formulated matrix resin is missing some or all of the curing agent(s) that are required for normal curing of the resin. The missing curing agent(s) are located in the fibrous portion of the prepreg 37. The curing agent(s) may be impregnated throughout the fibrous portion 37 or they may be located away from the prepreg component 35 that contains the matrix resin. In either case, the resin and curing agent(s) do not mix until the resin migrates through the fibrous portion 37 during the curing process. The partially formulated matrix resin becomes fully formulated as it migrates through fibrous portion 37 during the curing process. Accordingly, the cure accelerating agent present in the adhesion promoting layer 30 does not come in contact with the matrix resin until it is fully formulated. Prepreg in which a partially formulated matrix resin becomes fully formulated during cure are described in EP 1553125 A1, which corresponds to U.S. patent application Ser. No. 11/031,190, the contents of which are hereby incorporated by reference.

Examples of practice are as follows:

EXAMPLE 1

A solution of cure accelerating agent was prepared by dissolving 50 g of 2-ethyl-4-methyl imidazole (2E4MZ) (Shikoku Chemical Corporation—Chiba, Japan) into 1500 g of methylethylketone (MEK). 0.1 g of Oracet red (Ciba Specialty Chemicals—Basel, Switzerland) was included as a dye for identification purposes. A non woven glass mat having an areal weight of 50 gsm (style designation S5030 from Johns Manville, Waterville, Ohio) was passed through this solution and allowed to air dry at ambient temperature for 2 hours. The resultant adhesion promoting layer was a mat having an areal weight of 53.4 gsm. As a reference, the mat was also dipped into MEK and allowed to dry. This mat had an areal weight of 50.2 gsm. Accordingly, the mat used as the adhesion promoting layer had picked up approximately 3.2 gsm of the imidazole, which represents approximately 6% of the total weight of the adhesion promoting layer. This material was designated APL 1.

HexCoat® 02, a commercially available gelcoat from Hexcel Composites Ltd, Duxford, UK, was applied to a composite tool and gelled for 30 minutes at 70° C. The prepared APL 1 mat was applied to part of the surface of the gel coat. Some of the gel coat was left with no covering of APL 1 mat. Three plies of a prepreg containing 38 wt % M9.6 matrix resin impregnated in LBB1200 glass fabric were laid onto the APL 1 mat or gelcoat in the same manner as depicted in FIG. 1. M9.6 is a fully formulated epoxy resin that includes dicyandiamide and urone as the curing agents. M9.6 is available from Hexcel Composites Ltd. (Duxford, UK). LBB1200 is a 0°/+45°/−45° triax glass fabric of 1200 gsm fiber areal weight available from Hexcel Reinforcements (Villeurbanne, France).

The assembly was enclosed by a vacuum bag and cured using the following cure cycle: 1) start at ambient temperature; 2) ramp rate 1° C./min to 80° C.; 3) dwell for 4 hours; and 4) cool to ambient temperature. This vacuum curing technology is described in "Prepreg Technology Handbook" available from Hexcel Composites Ltd, Duxford, UK. For additional comparison, samples of the prepreg were applied to the gelcoat without the APL 1 mat and cured in the same manner as the other samples, except that the target cure temperature was 120° C.

In order to assess the bond integrity of the cured laminate, it was sectioned and the cut edges examined for areas of poor bonding. The sectioning was carried out using a band saw fitted with a gullotted rough cut blade. This type of blade has large portions of the blade missing which results in a very ragged and harsh cut. The gullotted saw blade had approximately 1 tooth per 2 cm with each tooth being 10 mm long and followed by a gullet (gap) of approximately 10 mm. The tip/edge of the blade had a diamond coating applied for optimum abrasion/cutting. The cut was made so that the blade passed through the gel coat layer last. There was no support for 5 mm on either side of the blade after it left the gel coat layer.

In the section where no mat was used, large pieces of gel coat (approximately 1 cm$^2$) were removed from the surface of the laminate by the sawing process. This section was given an adhesion rating of 3 (See Table 1). Where the adhesion promoting layer had been used, a clean cut was produced with no sections of gel coat being removed. This section was given an adhesion rating of 4. Samples cured at the much higher standard cure temperature of 120° C. also had an adhesion rating of 4. This example demonstrates that improved adhesion between the prepreg and gelcoat is obtained when an adhesion promoting layer is used in accordance with the present invention at a low cure temperature of 80° C.

EXAMPLE 2

HexCoat® 02 gelcoat was applied to a composite tool and gelled for 30 minutes at 70° C. The prepared APL 1 mat was applied to part of the surface of the gel coat and some of the gel coat surface was left with no covering of APL 1 mat. Three plies of a prepreg type material designated D1 were laid onto the APL 1 mat or gel coat as in FIG. 1. The assembly was enclosed by a vacuum bag and cured using the following cure cycle: 1) start at ambient temperature; 2) ramp rate 1° C./min to 80° C.; 3) dwell for 2 hours; and then 3) cool to ambient temperature. The D1 prepreg was of the type shown in FIG. 3 wherein a partially formulated resin film is located in one portion of the prepreg 35 and the remaining curing agent(s) are located in a different portion 37 that contains the fibrous reinforcement. This type of prepreg is also exemplified by Example 2 of European Patent application No. 1 553 125 A1.

The partially formulated resin film was composed of: 43.5 wt % GY280 epoxy resin and 43.5 wt % GT7071 epoxy resin, both of which are available from Huntsman Advance Materials (Duxford, UK); 4.0 wt % DYHARD 100SH; and 5.0 wt % UR500. DYHARD 100SH is a micronized dicyanidiamide and UR500 is a urone curative, both available from Deugussa (Zurich, Switzerland). The fibrous reinforcement was the same style (i.e. LBB 1200) as was used in Example 1, except that it was loaded with sufficient 2PZ to make up 4 wt % of the fully formulated resin rather than being loaded with fully formulated resin. Once loaded with 2PZ, the fibrous reinforcement was lightly tacked to the partially formulated resin film to provide the final prepreg assembly as shown at 34 in FIG. 3. It should be noted that the preceding weight percentages are based on the fully formulated resin after the partially formulated resin migrates into contact and mixes with the 2PZ curative in the fibrous reinforcement. The amount of partially formulated matrix resin film attached to the fibrous reinforcement was sufficient to provide an overall prepreg 34 having a nominal resin content of 38 wt %.

Although a blend of two epoxy resins was used in both Examples 2 and 3, more or less liquid resin components may be utilized, such selection being well understood by those skilled in the art. In this Example the adhesion promoting layer (APL 1) was applied directly to the gel coat as exemplified in FIG. 1. However, the adhesion promoting layer may be tacked to the fibrous reinforcement during manufacture or otherwise to provide an assembly of the type shown in FIG. 3 where the prepreg and adhesion promoting layer are applied to the gel coat at the same time.

The resulting laminate was cut on a band saw using the coarse blade in the same manner as Example 1. In the section where no APL 1 mat was used, large pieces of gel coat on the order of 1 cm$^2$ were removed from the surface of the laminate by the sawing process. This section was given an adhesion rating of 3 (see Table 1). Where the APL 1 mat had been used, a clean cut was produced with no sections of gel coat being removed. This section was given an adhesion rating of 4. This example also demonstrates that adhesion between the prepreg and gelcoat is improved when an adhesion promoting layer is used in accordance with the present invention at a low cure temperature of 80° C.

EXAMPLE 3

HexCoat® 02 was applied to a composite tool and gelled for 30 minutes at 70° C. The prepared APL 1 mat was applied to part of the surface of the gel coat. A mat that had not been impregnated with cure accelerating agent (CAA-free mat) was applied to a second section. Some gel coat was left without being covered by either mat. Six plies of a prepreg type material designated D2 were laid onto the APL 1 mat, CAA-free mat or gel coat in the same manner as Example 1. The assembly was enclosed by a vacuum bag and cured using the following cure cycle: 1) start at ambient temperature; 2) ramp rate 1° C./min to 65° C.; 3) dwell for 16 hours; and 4) cool to ambient temperature.

The D2 prepreg was the same as the D1 prepreg except the ratio of epoxy resins was changed slightly to enhance the tack of the prepreg, such adjustments being well understood in the industry. In addition, the fibrous reinforcement for the partially formulated resin was changed to BB600 which is a +45°/−45° biaxial glass fabric of 600 gsm fiber areal weight also available from Hexcel Reinforcements. The BB600 was loaded with sufficient 2E4MZ to make up 4 wt % of the fully formulated resin. Once loaded with 2E4MZ, the fibrous reinforcement was lightly tacked to the resin film. The percentage of matrix resin in the total prepreg assembly (i.e. BB600 impregnated with partially formulated resin and unidirectional fibers loaded with 2 PZ) was a nominal 38 wt %.

The resulting laminate was cut on a band saw using the coarse blade as in the same manner as Example 1. In the section where no mat was present, large pieces of gel coat on the order of 1 cm² were removed from the surface of the laminate by the sawing process. This section was given an adhesion rating of 3. Where the CAA-free mat was present, large pieces of gel coat on the order of 2 cm² were removed from the surface of the laminate by the sawing process. This section was given an adhesion rating of 2. Where the impregnated mat had been used a clean cut was produced with essentially no pieces of gel coat being removed. This section was given an adhesion rating of 4. This example further demonstrates that adhesion between the prepreg and gelcoat is improved when an adhesion promoting layer is used in accordance with the present invention at a low cure temperature of 65° C.

TABLE 1

| Adhesion Rating | Description |
| --- | --- |
| 0 | No adhesion - Gel coat peels off in one sheet |
| 1 | Minimal adhesion - Large pieces (greater than 2 × 2 cm) generated during coarse cutting |
| 2 | Light adhesion - Small pieces (1 × 1 to 2 × 2 cm) generated during coarse cutting |
| 3 | Moderate adhesion - very small pieces (less than 1 × 1 cm) generated during coarse cutting |
| 4 | Good adhesion - essentially no pieces generated during coarse cutting. |

Table 2 below summarizes the results of Examples 1-3 which show that the use of an adhesion promoting layer (APL1) gives improved adhesion for fully or partially impregnated prepreg systems that include fully or partially formulated epoxy resins and that this improved adhesion is provided over cure temperatures that range form 65-105° C. In addition, this improvement in adhesion is accomplished without detriment to the outlife of the prepreg.

TABLE 2

| Material | Cure Temp. (° C.) | Outlife in Days at Room Temperature (ca. 23° C.) | Adhesion Rating |
| --- | --- | --- | --- |
| M9.6 - no APL 1 | 120 (Standard) | 42 | 4 |
| M9.6 - no APL 1 | 80-105 | 42 | 2 |
| M9.6 + APL 1 | 80 | 42 | 4 |
| D 1 | 80 | >250 | 3 |
| D 1 + APL 1 | 80 | >250 | 4 |
| D 2 | 65 | >250 | 3 |
| D 2 + CAA-free mat | 65 | >250 | 2 |
| D 2 + APL 1 | 65 | >250 | 4 |

EXAMPLE 4

A solution was prepared by dissolving 15 g of Hypox RA-95 (CVC speciality chemicals Inc, Moorestown, N.J., USA) and 85 g of 2-ethyl-4-methyl imidazole (2E4MZ) (Shikoku Chemical Corporation—Chiba, Japan) in 900 g of methylethylketone (MEK). This provided a solution containing 8.5% 2E4MZ by weight and 1.5% Hypox RA-95 by weight.

A non woven glass mat having an areal weight of 50 gsm (style designation S5030 from Johns Manville, Waterville, Ohio) was passed through this solution and allowed to air dry at ambient temperature for 2 hours. The resultant adhesion promoting layer was a mat having an areal weight of 64.2 gsm. Accordingly, the mat used as the adhesion promoting layer had picked up approximately 12.1 gsm of the 2E4MZ and 2.1 gsm of the Hypox RA-95, which in combination represents approximately 22% of the total weight of the adhesion promoting layer. This material was designated APL 2.

APL 2 gave the same performance in adhesion tests (from 80° C. curing) as APL1 and additionally had sufficient stickiness or 'tack' that allowed it to be placed into vertical mold positions and facilitated its placement during processing into complex mould shapes. After 7 days of storage at room temperature the tack of this material had decreased to zero.

EXAMPLE 5

A solution of a solid rubber was prepared by dissolving 25 g of Nipol 1472 (Zeon corporation, Tokyo, Japan) and 50 g of 2E4MZ in 500 g of MEK. 240 g of the resulting solution was mixed with a further 160 g of MEK. This provided an MEK solution containing 5.2% 2E4MZ by weight and 2.6% Nipol 1472 by weight.

A non woven glass mat having an areal weight of 50 gsm (style designation S5030 from Johns Manville, Waterville, Ohio) was passed through this solution and allowed to air dry at ambient temperature for 2 hours. The resultant adhesion promoting layer was a mat having an areal weight of 66.4 gsm. Accordingly, the mat used as the adhesion promoting layer had picked up approximately 10.8 gsm of the 2E4MZ and 5.4 of the Nipol 1472, which represents approximately 24% of the total weight of the adhesion promoting layer. This material was designated APL 3

APL 3 gave the same performance in adhesion tests (from 80° C. curing) as APL1 and additionally had sufficient stickiness or 'tack' that allowed it to be placed into vertical mold positions and facilitated its placement during processing into complex mould shapes. After 30 days of storage at room temperature the tack of this material had not changed.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. A method for making a composite part which comprises a composite material having a surface to which a gel coat is adhered, said method involving the use of an adhesion promoting layer to increase the adhesion between the gel coat and the composite material when said gel coat and composite material are cured at a temperature in the range of 60° C. to 90° C., said method comprising the steps of:

providing a composite material having a first surface, said composite material comprising an uncured epoxy resin selected from the group consisting of diglycidyl ether of Bisphenol F and diglycidyl ether of Bisphenol A, a curing agent for said uncured epoxy resin comprising dicyandiamide and one or more accelerators for said uncured epoxy resin comprising, said one or more accelerators being selected from the group consisting of substituted ureas and substituted imidazoles, said composite material further comprising a fibrous reinforcement;

providing a gel coat that is in a gelled state, said gel coat having a second surface and wherein said gel coat comprises a gelled epoxy resin;

providing an adhesion promoting layer consisting of a fibrous element and a cure accelerating agent for said uncured epoxy resin selected from the group consisting of substituted imidazoles, salts of alkaline earth metals, azides, ureas, free radical initiators and amine salts of boron halogen complexes;

placing said adhesion promoting layer between said gel coat and said composite material so that said adhesion promoting layer is sandwiched between said first and second surfaces; and curing said composite material and said gel coat at a temperature in the range of 60° C. to 90° C. wherein the uncured epoxy resin present in said composite material travels through said adhesion promoting layer to form an adhesion promoted epoxy resin that directly contacts the gelled epoxy resin of said gel coat in order to provide direct bonding of said gel coat to said adhesion promoted epoxy resin wherein the adhesion of said composite material to said gel coat is greater with said adhesion promoting layer being present than without said adhesion promoting layer being present.

2. A method for making a composite part according to claim 1 wherein the fibers of said fibrous reinforcement and the fibers of said fibrous element are selected from the group consisting of glass, carbon, aramid, polyamide, polyester, cotton, hemp and kenaf.

3. A method for making a composite part according to claim 1 wherein said fibrous element is located on the first surface of said composite material prior to said fibrous element being sandwiched between said first and second surfaces.

4. A method for making a composite part according to claim 1 wherein said uncured epoxy resin, said curing agent and said one or more accelerators are mixed together in said composite material.

5. A method for making a composite part according to claim 1 wherein said fibrous reinforcement is a dry fibrous reinforcement that does not contain said uncured epoxy resin, curing agent or said one or more accelerators, wherein said uncured epoxy resin, curing agent and said one or more accelerators are in the form of an uncured resin film that is in contact with said dry fibrous reinforcement and wherein said dry fibrous reinforcement comprises a surface that forms the first surface of said composite material.

6. A method for making a composite part according to claim 5 wherein said fibrous element is located on the first surface of said composite material prior to said fibrous element being sandwiched between said first and second surfaces.

7. A method for making a composite part according to claim 6 wherein the fibers of said fibrous element have been coated with a tack agent.

8. A method for making a composite part according to claim 5 wherein said accelerator is a substituted urea and said cure accelerating agent is a substituted imidazole.

9. A method for making a composite part according to claim 8 wherein said cure accelerating agent is 2-ethyl-4-methyl imidazole and said accelerator for said uncured epoxy resin is a urone.

10. A method for making a composite material according to claim 1 wherein said fibrous reinforcement is an accelerator-modified dry fibrous reinforcement which comprises one of said accelerators but does not contain said uncured epoxy resin or curing agent wherein said accelerator-modified dry fibrous reinforcement comprises a surface that forms the first surface of said composite material.

11. A method for making a composite part according to claim 10 wherein said fibrous element is located on the first surface of said composite material prior to said fibrous element being sandwiched between said first and second surfaces.

12. A method for making a composite part according to claim 11 wherein the fibers of said fibrous element have been coated with a tack agent.

13. A method for making a composite part according to claim 10 wherein said composite material comprises an uncured resin film located in contact with said accelerator-modified dry fibrous reinforcement, said uncured resin film comprising said uncured epoxy resin, said curing agent and said one or more accelerators.

14. A method for making a composite part according to claim 10 wherein said accelerator for said uncured epoxy resin is a substituted urea, said cure accelerating agent is a substituted imidazole and said accelerator in said accelerator-modified dry fibrous reinforcement is a substituted imidazole.

15. A method for making a composite part according to claim 14 wherein said accelerator for said uncured epoxy resin is a urone, said cure accelerating agent is 2-ethyl-4-methyl imidazole and said accelerator in said accelerator-modified dry fibrous reinforcement is 2-ethyl-4-methyl imidazole or 2-phenyl-imidazole.

16. A method for making a composite part according to claim 1 wherein the fibers of said fibrous element are coated with a tack agent.

17. A method for making a composite part according to claim 1 wherein said adhesion promoting layer remains separated from both said composite material and said gel coat until said adhesion promoting layer is sandwiched between said first and second surfaces.

18. A method for making a composite part according to claim 1 wherein said uncured epoxy resin, curing agent and accelerator are distributed throughout the fibrous reinforcement of said composite material.

19. A method for making a composite part according to claim 1 wherein said accelerator for said uncured epoxy resin is a substituted urea and said cure accelerating agent is a substituted imidazole.

20. A method for making a composite part according to claim 19 wherein said cure accelerating agent is 2-ethyl-4-methyl imidazole and said accelerator for said uncured epoxy resin is a urone.

* * * * *